United States Patent [19]

Piltingsrud

[11] 3,950,647
[45] Apr. 13, 1976

[54] DETECTION INSTRUMENT FOR PLUTONIUM-AMERICIUM

[76] Inventor: Harley V. Piltingsrud, 522 Grand Ave., Dayton, Ohio 45406

[22] Filed: Sept. 25, 1974

[21] Appl. No.: 508,980

[52] U.S. Cl. .............................................. 250/361
[51] Int. Cl.² .......................................... G01T 1/20
[58] Field of Search ........... 250/361, 362, 363, 366, 250/368

[56] References Cited
UNITED STATES PATENTS

| | | | |
|---|---|---|---|
| 2,772,368 | 11/1956 | Scherbatskoy | 250/361 X |
| 3,008,045 | 11/1961 | Ruderman | 250/366 |
| 3,068,359 | 12/1962 | Carlson | 250/366 |
| 3,723,735 | 3/1973 | Spelha et al. | 250/366 |

*Primary Examiner*—Archie R. Borchelt
*Attorney, Agent, or Firm*—Joseph E. Rusz; Richard J. Killoren

[57] ABSTRACT

A plutonium-americium detection instrument having an end window type photomultiplier tube supported in a light weight aluminum housing. An europium activated calcium fluoride scintillation crystal coupled directly to the face plate of the photomultiplier tube with a silicone optical coupling grease. An aluminum window is supported on a styrofoam support and positioned adjacent to said scintillation crystal.

4 Claims, 5 Drawing Figures

DETECTION INSTRUMENT FOR PLUTONIUM-AMERICIUM

RIGHTS OF THE GOVERNMENT

The invention described herein may be manufactured and used by or for the Government of the United States for all governmental purposes without the payment of any royalty.

BACKGROUND OF THE INVENTION

In prior art instruments used for the detection of plutonium-americium, various scintillation crystals have been used. These crystals have been mounted on a thick quartz light pipe which is attached to a photomultiplier tube. Europium activated calcium fluoride crystals have been used in these devices but have produced very poor results.

The instrument in present use consists of a thallium activated, sodium-iodide scintillation crystal mounted on a thick quartz light pipe which is attached to a photomultiplier tube. The components are sealed in a stainless-steel case with a beryllium window.

These instruments have failed due to cracked and hydrated crystals, defective photomultiplier tubes, holes in the beryllium window and seal failings in the outer casing. Due to the hygroscopic properties of the NaI (Tl) and the special cement used to seal the assemblies together, no field repair of the instrument is possible. Therefore, repair of these instruments is expensive and time consuming.

BRIEF SUMMARY OF THE INVENTION

According to this invention, an europium activated calcium fluoride scintillation crystal is directly coupled to the glass window of a photomultiplier tube with an optical coupling silicone grease. It was found that when the europium activated calcium fluoride crystal was coupled directly to the face of the photomultiplier tube, the transmission losses in the quartz light pipe were eliminated and acceptable results were obtained. Also, the europium activated calcium fluoride crystal is very rugged with properties similar to pyrex glass and it also has nonhygroscopic properties which permits field repair of the instrument. With this crystal, the enclosure need not be hermetically sealed which allows the use of a low cost window. The window in the device of the invention acts as a reflector adjacent the scintillation crystal and also is light impervious and provides an electrostatic shield. This may be a thin sheet of aluminum on a shock absorbant support, such as styrofoam which also provides a protective cushion for the scintillation crystal, or it may be a thin layer of aluminum coated on the crystal with a light tight conductive layer over the aluminum. The scintillation crystal may be coupled directly to the face plate of the photomultiplier tube or may form the face plate of the photomultiplier tube. The total weight of this instrument is less than one half that of the prior art instruments.

IN THE DRAWING

DETAILED DESCRIPTION OF THE INVENTION

Figure 1:
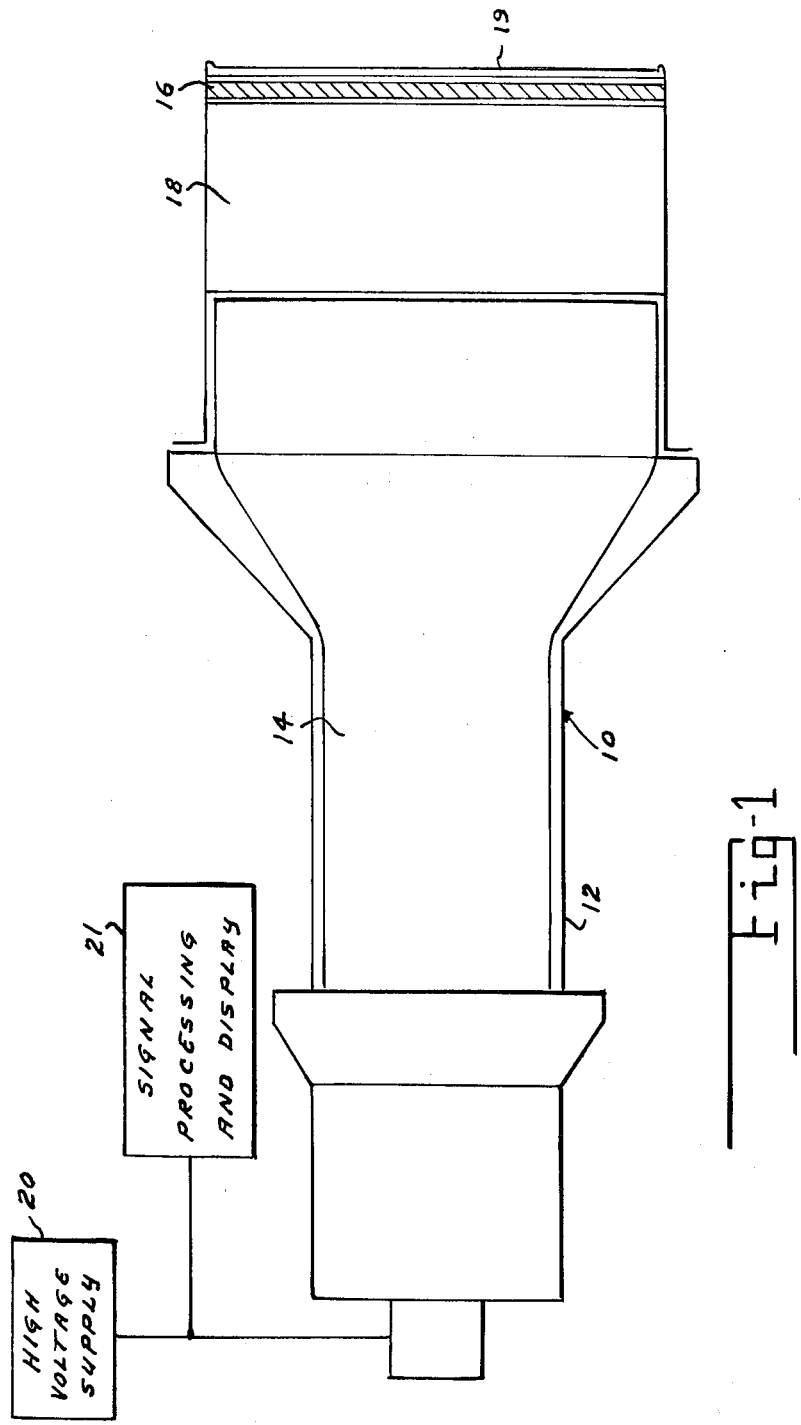
FIG. 1 is a schematic illustration of a prior art plutonium-americium detection instrument.

Reference is now made to FIG. 1 of the drawing which shows a prior art plutonium-americium detection instrument 10 having a stainless-steel housing 12 with a photo multiplier 14 within the housing. A thallium activated, sodium-iodide scintillation crystal 16 is mounted on a quartz light pipe 18 which is attached to the photomultiplier 14. A beryllium window 19 is sealed to the housing 12. The probe of FIG. 1 is normally connected to a high voltage supply 20 and a ratemeter and recorder 21.

Figure 2:
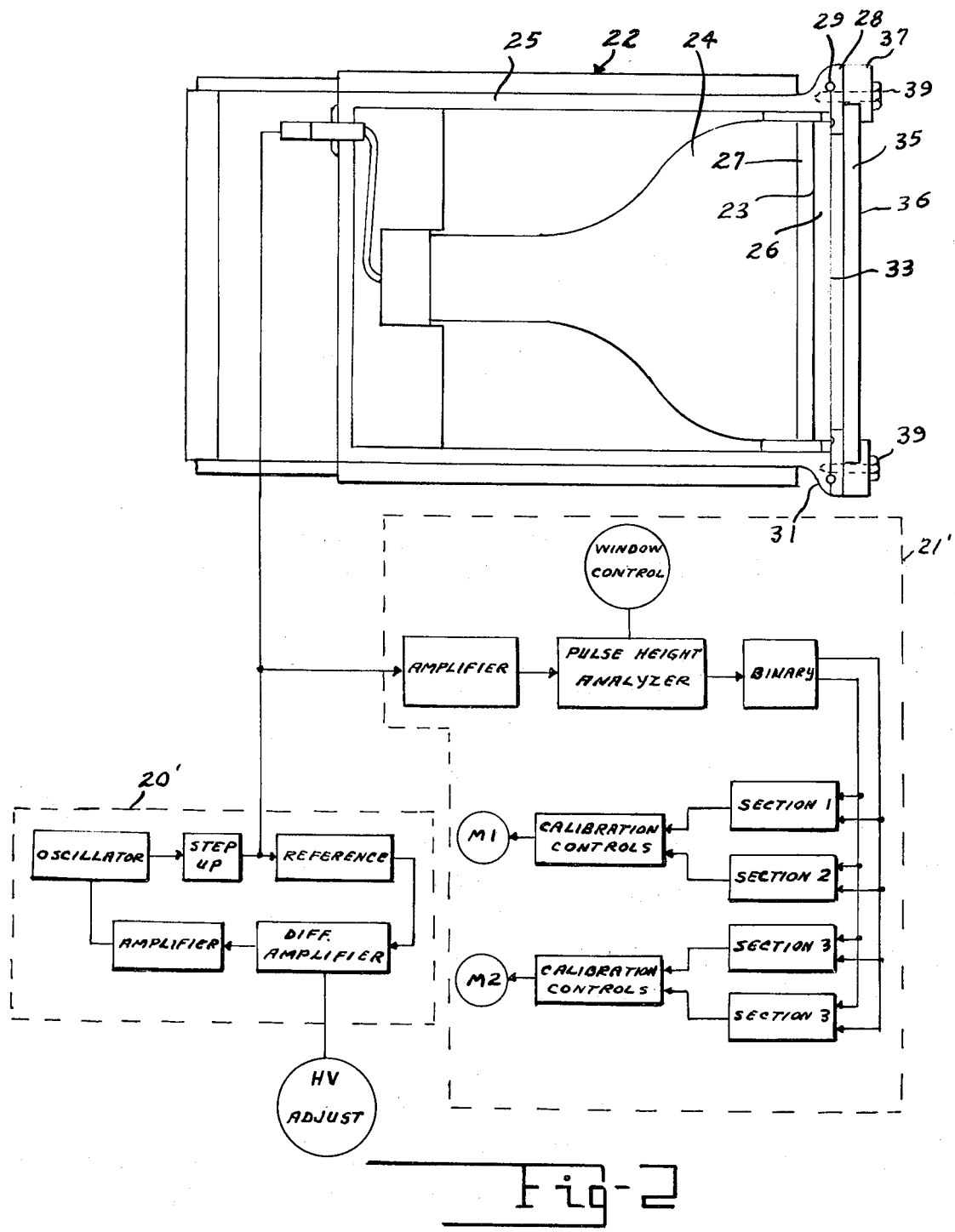
FIG. 2 is a schematic illustration of a plutonium-americium detection instrument according to the invention.

The plutonium-americium detection probe of the invention is shown at 22, in FIG. 2, connected to a high voltage supply circuit 20' and a signal processing and display 21'.

Figure 3:
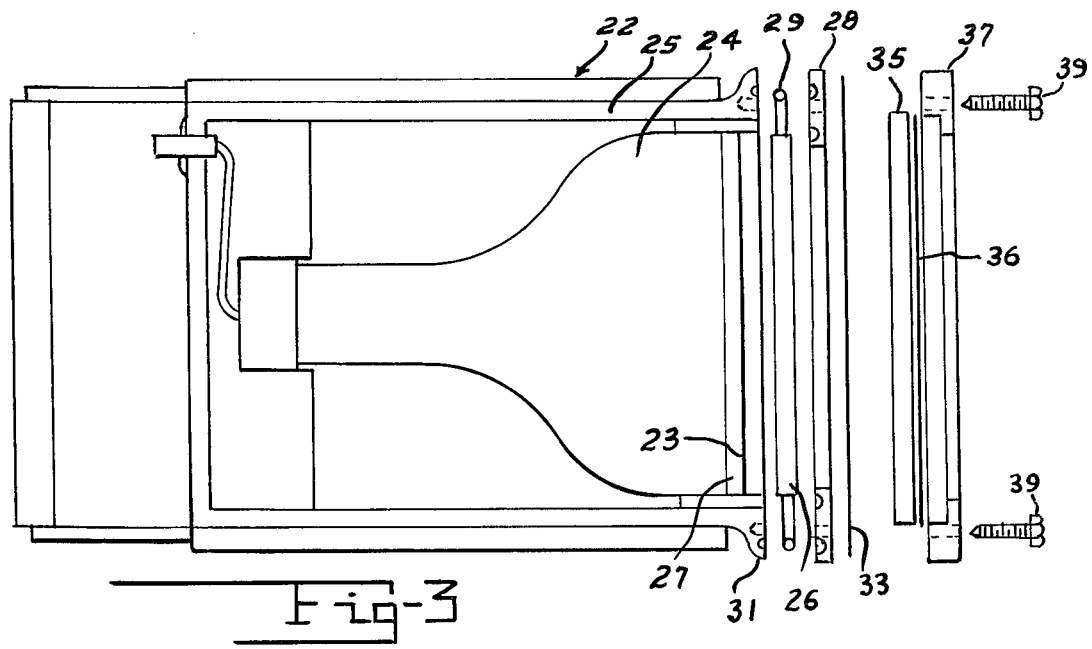
FIG. 3 is a partially exploded view of the detection probe of the device of FIG. 2.

The probe 22, as shown in greater detail in the partially exploded view of FIG. 3, has a photomultiplier tube 24 mounted within a housing 25. The housing is made of a non-radioactive material, for example, a metal such as aluminum. An europium activated calcium fluoride scintillation crystal 26 is directly coupled to the face plate 27 of the photomultiplier tube 24, with an optical coupling silicone grease 23. One such grease is Dow-Corning 20-057. A mounting ring 28 is positioned over the scintillation crystal 26 with an O-ring seal 29 provided between ring 28 and flange mount 31 on the housing 25.

A thin sheet 33 of aluminum foil is positioned over the ring 28, with a styrofoam disk 35 and Mylar sheet 36 positioned over the aluminum foil. The Mylar sheet provides a seal to prevent radioactive contamination of the interior of the housing. A flange mount 37 is secured to the flange mount 31 by means of bolts 39 and holds the Mylar sheet, the aluminum foil sheet and styrofoam disk in place as shown in FIG. 2.

Figure 4:
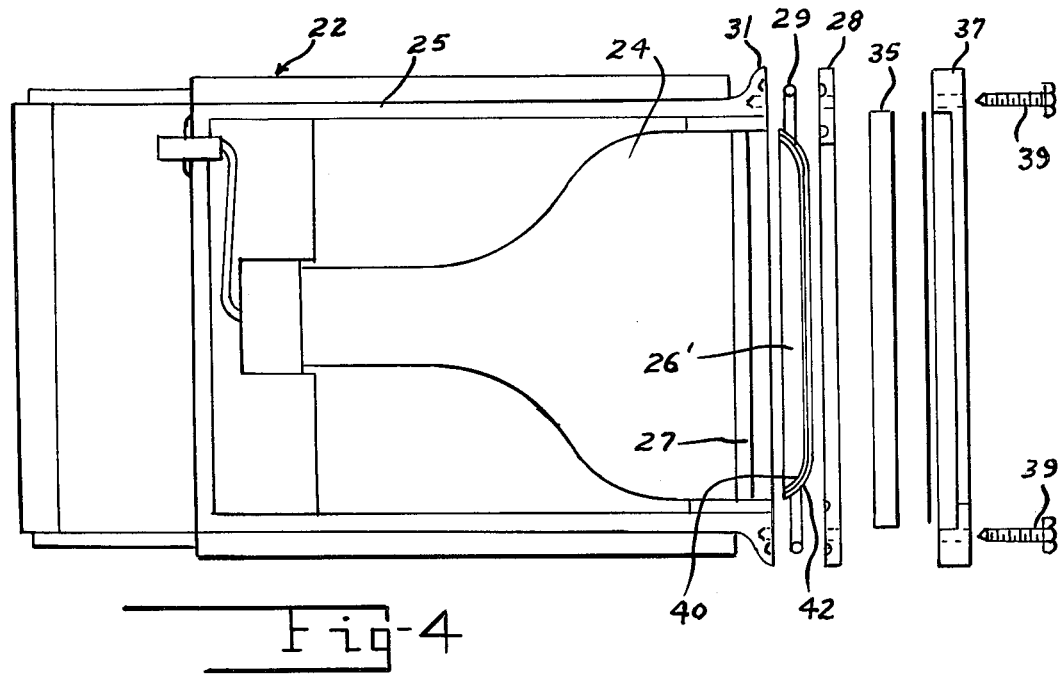
FIG. 4 is a partially exploded schematic illustration of a detection probe according to another embodiment of the invention.

The device of the invention can be further simplified as shown in FIG. 4. In this device, the side of the scintillation crystal 26' remote from the photomultiplier tube 24 is coated with a layer 40 of highly reflective material, which in one device constructed was vacuum deposited aluminum. A coating of electrically conductive black paint is coated over the reflective layer 40 to provide a light tight window and an electrostatic shield. In the device constructed, the layer 42 was carbon loaded collodion. The remainder of the elements which are the same as in the device of FIG. 2, are given like reference numbers.

Figure 5:
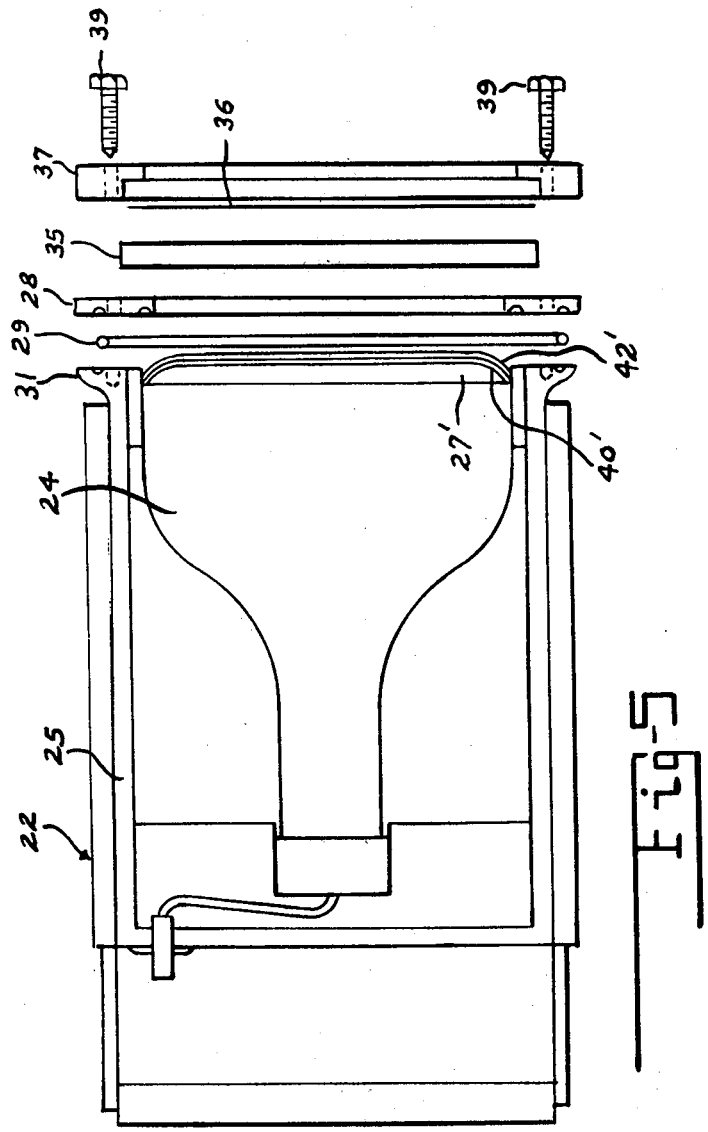
FIG. 5 is a partially exploded schematic illustration of a detection probe according to a further embodiment of the invention.

The device of FIG. 4 can be further simplified as shown in FIG. 5. Unactivated calcium fluoride has been used for the face plate of photomultiplier tubes. According to this invention, an europium activated calcium fluoride face plate 27' is provided for the photomultiplier tube. This then acts as a photomultiplier tube face plate as well as a scintillation crystal making the use of a separate scintillation crystal unnecessary. In this device, the highly reflective material 40' and the electrically conductive black paint 42' are coated directly on the face plate of the photomultiplier tube.

In the operation of the device of the invention, plutonium-americium electromagnetic emissions are detected in substantially the same manner as in prior art device.

There is thus provided a plutonium-americium electromagnetic emission detector wherein the total weight of the instrument is much less than prior art devices and wherein field repair of the instrument is possible.

I claim:

1. An apparatus for detecting the normal radiation from plutonium-americium, comprising: a non-radioactive metal housing; an end window type photomultiplier tube; means for supporting said photomultiplier tube within said housing; a europium activated calcium fluoride scintillation crystal directly coupled to said photomultiplier tube; a light impervious, reflective, electrostatic shield on the side of said scintillation crystal remote from said photomultiplier tube; a shock absorbent layer on the side of said light impervious, reflective, electrostatic shield, remote from said scintillation crystal; means secured to said housing for retaining said shield within said housing; a radioactive contamination barrier layer on the side of said shock absorbant layer, remote from said scintillation crystal; means for supplying power to said photomultiplier tube and means, for indicating the level of plutonium-americium electromagnetic emission reaching said detection instrument.

2. The device as recited in claim 1 wherein a face plate forms the end window of the photomultiplier tube; said scintillation crystal being coupled directly to said face plate with optical coupling grease; said light impervious, reflective, electrostatic shield being a thin sheet of aluminum supported on the side of said shock absorbant shield adjacent said scintillation crystal.

3. The device as recited in claim 1 wherein said light impervious, reflective, electrostatic shield includes a layer of aluminum vacuum deposited on said scintillation crystal and an electrically conductive black paint coated over the aluminum layer.

4. The device as recited in claim 3 wherein said europium activated calcium fluoride scintillation crystal forms the face plate of said photomultiplier tube.

* * * * *